March 29, 1927.

A. CLAYPOOLE 1,622,765

GEARED LOCOMOTIVE

Filed May 14, 1925

2 Sheets-Sheet 1

Inventor
Albert Claypoole
By
Attorney

March 29, 1927. 1,622,765

A. CLAYPOOLE

GEARED LOCOMOTIVE

Filed May 14, 1925 2 Sheets-Sheet 2

Inventor
Albert Claypoole
By
Attorney

Patented Mar. 29, 1927.

1,622,765

UNITED STATES PATENT OFFICE.

ALBERT CLAYPOOLE, OF PORTLAND, OREGON, ASSIGNOR TO WILLAMETTE IRON & STEEL WORKS, OF PORTLAND, OREGON, A CORPORATION OF OREGON.

GEARED LOCOMOTIVE.

Application filed May 14, 1925. Serial No. 30,342.

Locomotive trucks provided with gearing usually have the ordinary plates which are arranged in the truck frame bearing cavities and ride on the ends of the truck axles. Where the longitudinal driving shaft operates on gears carried by the axle, or adjacent to the wheels the thrust of these gears under heavy load is sufficient to lift the frame or bearing plates of the frame off the axle, thus straining the gears and frame. The present invention is designed to obviate this difficulty.

The invention is illustrated in the accompanying drawings as follows:—

Figure 1:
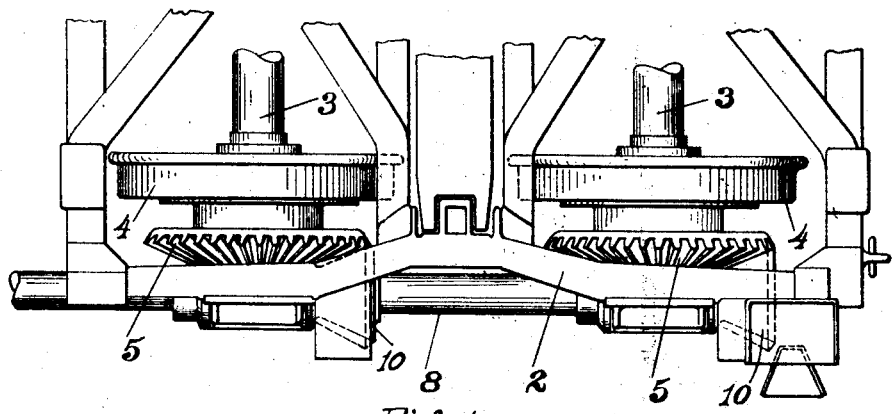

Fig. 1 shows a plan view of the driving side of a geared locomotive truck.

Figure 2:
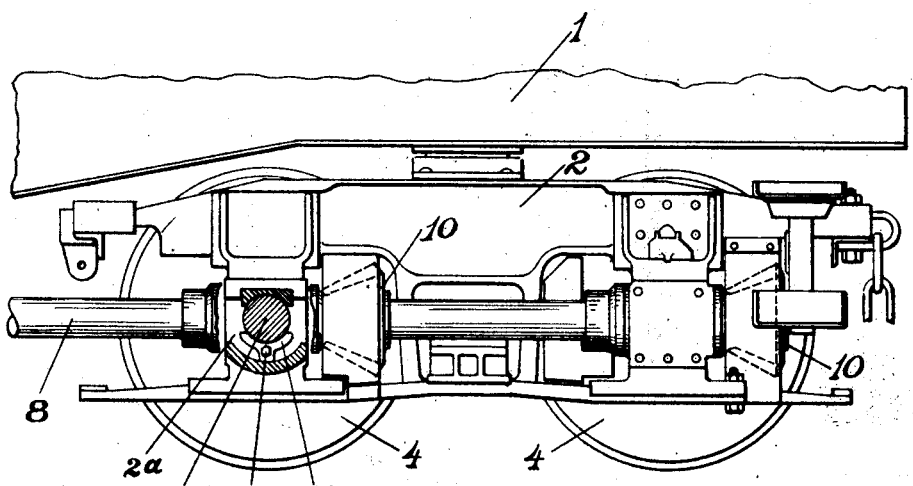

Fig. 2 a side elevation of the same.

Figure 3:
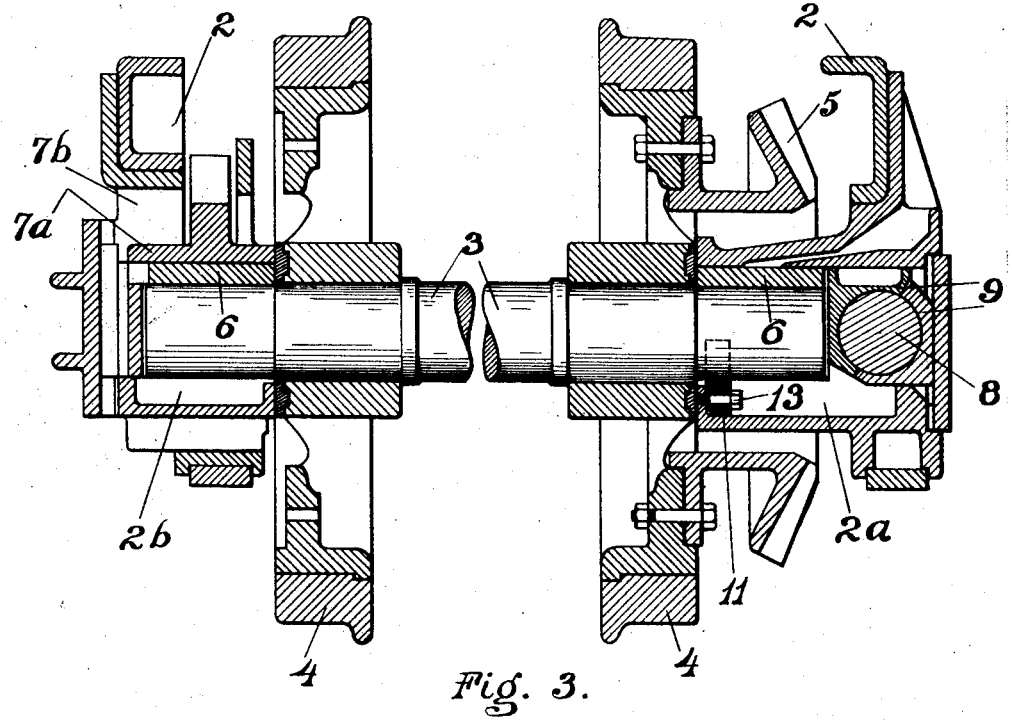

Fig. 3 a sectional view through an axle.

Figure 4:
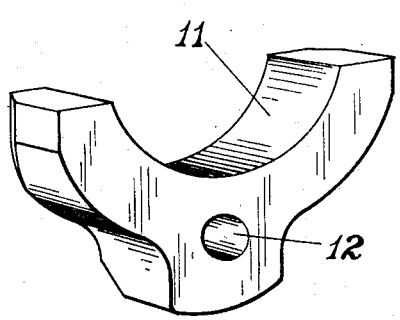

Fig. 4 a perspective view of a locking plate for locking the frame against lifting on the axle.

1 marks the locomotive frame, 2 the truck frame, 3 the axle, 4 the wheels mounted on the axle, 5 the drive gears locked with the axle and as shown mounted directly on the wheels, and 6 bearing plates for the ends of the axle arranged in bearing cavities $2^a$ and $2^b$ in the frame.

A longitudinal driving shaft 8 extends along the truck at one of the ends of the axle and is carried by bearings 9 arranged on the frame in alinement with the axle. Driving gears 10 are fixed on the driving shaft 8 and mesh with the gears 5 on the wheels. Thus the locomotive is driven from the driving shaft through the gears and driving wheels. These parts are of ordinary construction.

A locking plate 11, which is in the form of a segmental bearing plate, has perforations 12 through which a securing bolt or stud 13 extends into the inner wall of the bearing cavity $2^a$. This plate locks the frame against a lifting action on the axle and thus retains the gears in proper mesh and the parts in place when the engine is working under heavy load.

The locking plate is preferably made narrow so as to permit of a slight cocking action of the axle due to the vertical movement, or play of the axle with the frame at the opposite end, the bearing cavity $2^b$ being carried in a sliding box $7^a$ operating in a pedestal $7^b$ of ordinary construction.

What I claim as new is:—

1. In a geared locomotive, the combination of a truck frame having bearing cavities therein; an axle; wheels on the axle; a driven gear locked with the axle; a longitudinal drive shaft; bearings on the frame for the drive shaft; a driving gear on the drive shaft meshing with the driven gear; bearing plates in the cavities resting on the axle and supporting the frame; and means below the axle locking the frame against lifting on the axle through the thrust of the driving gear.

2. In a geared locomotive, the combination of a truck frame having bearing cavities therein; an axle; wheels on the axle; a driven gear locked with the axle; a longitudinal drive shaft; bearings on the frame for the drive shaft; a driving gear on the drive shaft meshing with the driven gear; bearing plates in the cavities resting on the axle and supporting the frame; and means in the bearing cavity below the bearing plate locking the frame against lifting on the axle through the thrust of the driving gear.

3. In a geared locomotive, the combination of a truck frame having bearing cavities therein; an axle; wheels on the axle; a driven gear locked with the axle; a longitudinal drive shaft; bearings on the frame for the drive shaft; a driving gear on the drive shaft meshing with the driven gear; bearing plates in the cavities resting on the axle and supporting the frame; a segmental plate arranged within the bearing cavity at the gear end of the axle and below the bearing plate therein locking the frame against lifting on the axle, said plate being narrower than the bearing plate.

4. In a geared locomotive, the combination of a truck frame having bearing cavities therein and a pedestal at one side; an axle; wheels mounted on the axle; a driving gear locked with the axle; a vertically movable bearing for the axle at the end opposite the driving gear; a bearing for the gear end of the axle comprising a bearing plate above the axle; a longitudinal driving shaft; a driving gear on the driving shaft meshing with the gear locked with the axle; and a locking plate below the axle and at the gear end of the axle locking the axle against vertical movement relatively to the frame, said locking plate being narrower than the opposing bearing plate.

In testimony whereof I have hereunto set my hand.

ALBERT CLAYPOOLE.